United States Patent
Narikawa et al.

(10) Patent No.: US 10,819,964 B2
(45) Date of Patent: Oct. 27, 2020

(54) PROJECTION APPARATUS, PROJECTION METHOD, AND STORAGE MEDIUM

(71) Applicant: CASIO COMPUTER CO., LTD., Tokyo (JP)

(72) Inventors: Tetsuro Narikawa, Hamura (JP); Akihide Takasu, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/718,259

(22) Filed: Sep. 28, 2017

(65) Prior Publication Data
US 2018/0167593 A1    Jun. 14, 2018

(30) Foreign Application Priority Data
Dec. 14, 2016  (JP) ................................ 2016-241917

(51) Int. Cl.
*H04N 9/31*    (2006.01)
*G09G 3/00*    (2006.01)
(Continued)

(52) U.S. Cl.
CPC ......... *H04N 9/3194* (2013.01); *G03B 21/005* (2013.01); *G09G 3/002* (2013.01);
(Continued)

(58) Field of Classification Search
CPC .. H04N 9/3194; H04N 9/3185; H04N 9/3182; H04N 9/31; G09G 3/002;
(Continued)

(56) References Cited

U.S. PATENT DOCUMENTS 8,182,093 B2 * 5/2012 Kurozuka ............ H04N 9/3129
353/37
9,495,936 B1 * 11/2016 Norquist .................. G09G 5/02
(Continued)

FOREIGN PATENT DOCUMENTS

CN    101542585 A    9/2009
JP    2007-259472 A    10/2007
(Continued)

OTHER PUBLICATIONS

JPO; Application No. 2016-241917; Notification of Reasons for Refusal dated Jul. 12, 2018.
(Continued)

*Primary Examiner* — Jefferey F Harold
*Assistant Examiner* — Humam M Satti
(74) *Attorney, Agent, or Firm* — Fitch, Even, Tabin & Flannery LLP

(57) ABSTRACT

A projection apparatus includes a projection surface information acquisition unit that acquires a surface shape and/or color information of the projection target surface from the projection image acquired by the projection image acquisition unit; and a projection control unit that determines, based on the surface shape and/or the color information of the projection target surface acquired by the projection surface information acquisition unit, a projection range and a projection position where projection is performed, from a projectable range of the projection unit, and performs projection so as to obtain a defined shape on the projection target surface.

4 Claims, 5 Drawing Sheets

(51) Int. Cl.
    *G03B 21/00*     (2006.01)
    *G09G 5/38*     (2006.01)
    *G09G 5/00*     (2006.01)
    *G09G 5/36*     (2006.01)
    *G09G 3/20*     (2006.01)
    *G03B 17/54*     (2006.01)

(52) U.S. Cl.
    CPC ............ *G09G 3/2003* (2013.01); *G09G 5/00* (2013.01); *G09G 5/36* (2013.01); *G09G 5/38* (2013.01); *H04N 9/3182* (2013.01); *H04N 9/3185* (2013.01); *G03B 17/54* (2013.01); *G03B 2206/00* (2013.01); *G09G 2370/12* (2013.01); *G09G 2370/16* (2013.01)

(58) Field of Classification Search
    CPC .. G09G 5/38; G09G 5/00; G09G 5/36; G09G 3/2003; G09G 2370/12; G09G 2370/16; G03B 21/005; G03B 17/54; G03B 2206/00; G03B 21/00
    See application file for complete search history.

(56) References Cited

U.S. PATENT DOCUMENTS

| | | | | |
|---|---|---|---|---|
| 2008/0013057 | A1* | 1/2008 | Bullock | H04N 9/3185 353/121 |
| 2009/0153562 | A1 | 6/2009 | Nishimura | |
| 2009/0207322 | A1* | 8/2009 | Mizuuchi | H04N 9/3185 348/745 |
| 2011/0018897 | A1* | 1/2011 | Uchiyama | H04N 9/3176 345/619 |
| 2013/0083298 | A1* | 4/2013 | Yoshimura | H04N 9/3194 353/69 |
| 2013/0162814 | A1* | 6/2013 | Shin | H04N 7/18 348/135 |
| 2015/0092049 | A1* | 4/2015 | Chen | G01B 11/25 348/136 |
| 2015/0103257 | A1* | 4/2015 | Nakashin | H04N 9/3194 348/746 |
| 2015/0254819 | A1* | 9/2015 | Hara | G06T 5/006 345/647 |
| 2015/0268537 | A1 | 9/2015 | Kinebuchi et al. | |
| 2016/0134849 | A1* | 5/2016 | Wang | H04N 9/3147 348/744 |
| 2016/0182870 | A1* | 6/2016 | Ito | H04N 9/3188 348/208.4 |
| 2017/0223322 | A1* | 8/2017 | Grundhofer | H04N 9/3129 |

FOREIGN PATENT DOCUMENTS

| | | |
|---|---|---|
| JP | 2014-192808 A | 10/2014 |
| JP | 2015-184383 A | 10/2015 |

OTHER PUBLICATIONS

CNIPA; Application No. 201711098803.5; Office Action dated Jan. 17, 2020.

* cited by examiner

PROJECTION APPARATUS, PROJECTION METHOD, AND STORAGE MEDIUM

CROSS-REFERENCE TO RELATED APPLICATIONS

This application is based upon and claims the benefit of priority from Japanese Patent Application No. 2016-241917, filed Dec. 14, 2016, the entire contents of which are incorporated herein by reference.

BACKGROUND OF THE INVENTION

1. Field of the Invention

The present invention relates to a projection apparatus that projects an image on a projection target other than a dedicated screen, a projection method, and a storage medium.

2. Description of the Related Art

Since a projector that projects a color image does not correctly implement color reproduction when a projection surface such as a wall is colored, Jpn. Pat. Appln. KOKAI Publication No. 2007-259472 proposes a technique of performing projection after correcting the mixing amounts of primary colors by a transformation matrix using the spectral reflectance of a projection surface or color information under a light source.

The technique described in Jpn. Pat. Appln. KOKAI Publication No. 2007-259472 is proposed by assuming that the entire projection surface is in a flat shape and has a single color, and cannot cope with, for example, a case in which an image is projected on a non-single-color projection target, such as a curtain with a pattern, that has a surface with a three-dimensional structure or a curved surface generated by a wave.

The present invention has been made in consideration of the above problem, and it is an object of the present invention to provide a projection apparatus, a projection method, and a storage medium, capable of projecting a large image having quality as high as possible on a projection target other than a dedicated screen.

SUMMARY OF THE INVENTION

According to one aspect of the present invention, there is provided a projection apparatus comprising: a projection unit that projects an image; a projection image acquisition unit that acquires a projection image on a projection target surface on which the projection unit projects the image; a projection surface information acquisition unit that acquires a surface shape and/or color information of the projection target surface from the projection image acquired by the projection image acquisition unit; and a projection control unit that determines, based on the surface shape and/or the color information of the projection target surface acquired by the projection surface information acquisition unit, a projection range and a projection position where projection is performed, from a projectable range of the projection unit, and performs projection so as to obtain a defined shape on the projection target surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment when the present invention is applied to a projector apparatus will be described in detail below with reference to the accompanying drawings.

Figure 1:
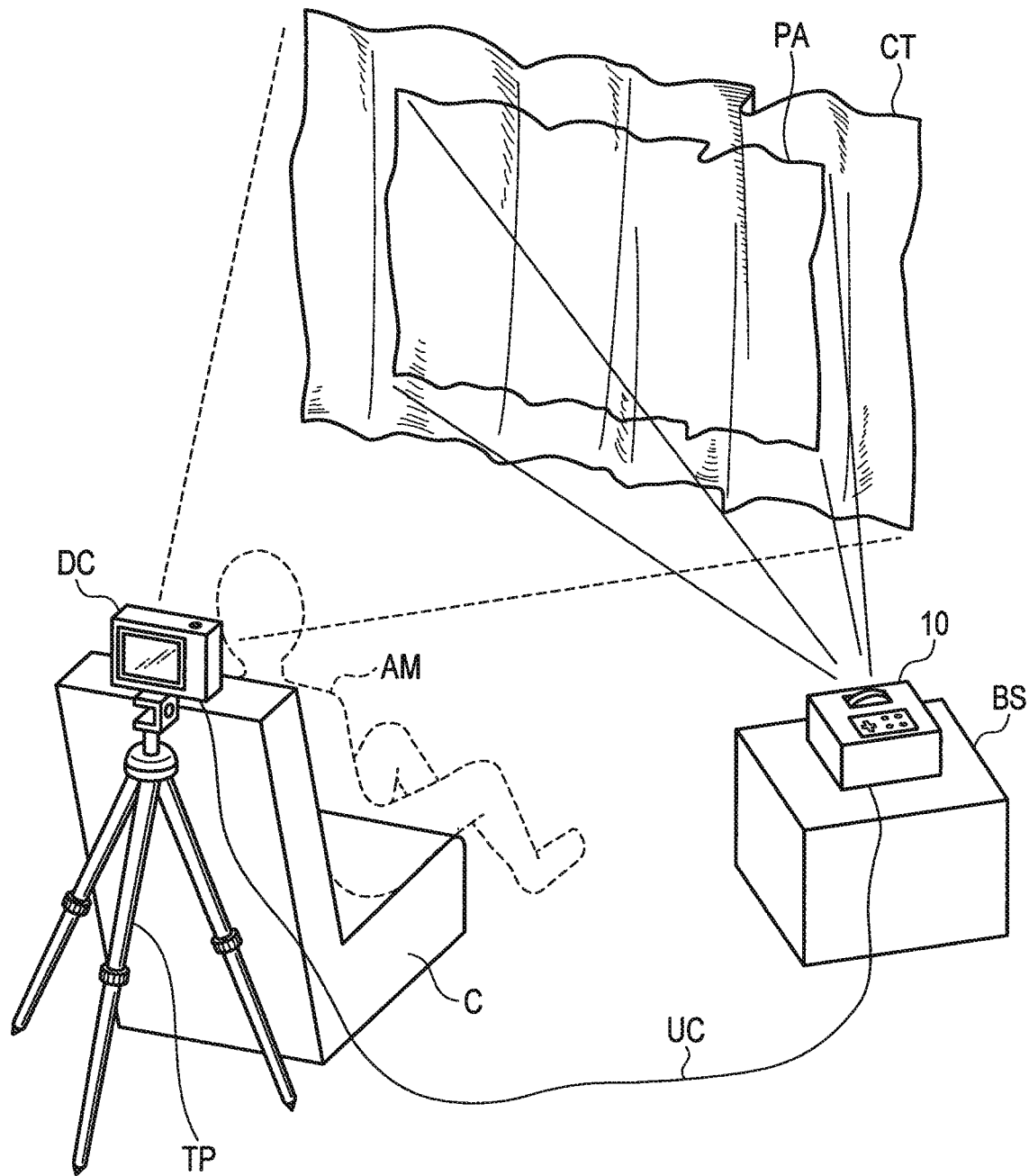
FIG. 1 is a view exemplifying an environment when a projector apparatus is installed according to an embodiment of the present invention.

FIG. 1 is a view exemplifying an environment at the time of projection range setting that is executed when a projector apparatus 10 is installed according to the embodiment.

FIG. 1 shows a state in which the projector apparatus 10 is placed on a stand BS, and a test rectangular image whose entire surface is white is projected toward a curtain CT as a substitute for a screen from a position shifted from the front or a position offset rightward with respect to the curtain CT in FIG. 1.

The curtain CT is folded in a wave shape and used. Even in the state shown in FIG. 1 in which the curtain CT is used as a projection target, the surface of the curtain CT largely waves mainly in the horizontal direction. FIG. 1 shows a state in which a projection range PA of the projector apparatus 10 has an indefinite shape conforming to the surface shape of the curtain CT.

On the other hand, a chair C is installed in front of the curtain CT. Furthermore, instead of a viewer AM who is to sit on the chair C, a digital camera DC attached to a tripod TP is installed at a position as close as possible to the positions of the two eyes of the viewer AM. That is, the digital camera DC is installed to recognize the projection range PA on the curtain CT seen from the two eyes of the viewer AM.

The digital camera DC and the projector apparatus 10 are connected via, for example, a USB (Universal Serial Bus) cable UC. The digital camera DC shoots an image including the curtain CT and the projection range PA on the curtain CT in accordance with a control command input from the projector apparatus 10 via the USB cable UC, and sends, to the projector apparatus 10 via the USB cable UC, image data obtained by the shooting operation. Alternatively, the digital camera DC and the projector apparatus 10 may be configured to be connected via a personal computer.

Figure 2:
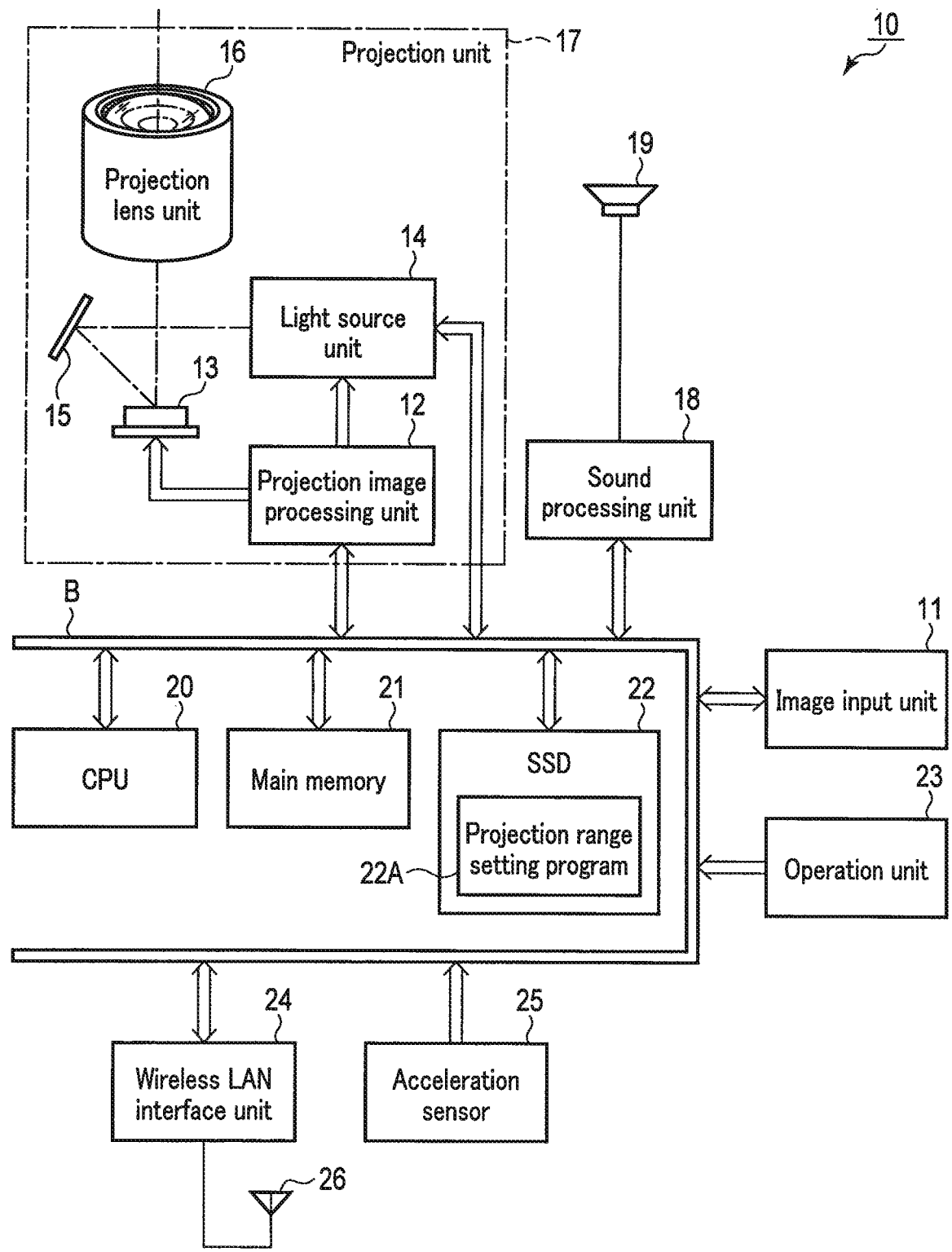
FIG. 2 is a block diagram showing the functional arrangement of the electronic circuits of the projector apparatus according to the embodiment of the present invention.

The functional arrangement of the electronic circuits of the projector apparatus 10 will mainly be described with reference to FIG. 2. Referring to FIG. 2, an image input unit (projection image acquisition unit) 11 is formed by, for example, a video input terminal of a pin jack (RCA) type, an RGB input terminal of a D-sub15 type, an HDMI® (High-Definition Multimedia Interface) terminal, a USB terminal, and the like.

Analog or digital image signals based on various kinds of standards which are input to the image input unit 11 or which are stored in a USB memory and selectively read out are digitized by the image input unit 11 as needed, and then sent to a projection image processing unit 12 via a bus B.

In accordance with the sent image data, the projection image processing unit 12 performs display driving of a micromirror element 13 serving as a display element by higher-speed time division driving implemented by multiplying a frame rate complying with a predetermined format, for example, 120 [frames/sec] that is twice a frame rate of 60 [frames/sec] of the input image data by the division number of color components and a display gradation number.

The micromirror element 13 performs a display operation by quickly turning on/off each of the tilt angles of a plurality of micromirrors, arranged in an array, for 1,280 pixels in the horizontal direction×960 pixels in the vertical direction, thereby forming an optical image using the reflected light.

On the other hand, a light source unit 14 cyclically, time-divisionally emits primary color light beams of R, G, and B. The light source unit 14 includes an LED as a semiconductor light-emitting element, and repeatedly, time-divisionally emits the primary color light beams of R, G, and B. The LED of the light source unit 14 may include an LD (semiconductor laser) or organic EL element, as an LED in a wide sense. The primary color light from the light source unit 14 is totally reflected by a mirror 15, and the micromirror element 13 is irradiated with the light.

An optical image is formed by the light reflected by the micromirror element 13, and then projected and displayed outside via a projection lens unit 16.

The projection image processing unit 12, the micromirror element 13, the light source unit 14, the mirror 15, and the projection lens unit 16 form a projection unit 17.

If the image signals input from the image input unit 11 include a sound signal, the sound signal is separated from the image signals by the image input unit 11, and sent to a sound processing unit 18 via the bus B. The sound processing unit 18 includes a sound source circuit such as a PCM sound source, and converts, into an analog signal, a sound signal provided at the time of a projection operation, and drives a speaker 19 to output a sound or generate a beep sound or the like, as needed.

A CPU 20 controls all of the operations of the above circuits. This CPU 20 is connected to a main memory 21 and an SSD (Solid State Drive) 22. The main memory 21 is formed by, for example, an SRAM, and functions as a work memory for the CPU 20. The SSD 22 is formed by an electrically rewritable nonvolatile memory, for example, a flash ROM, and stores various operation programs including a projection range setting program 22A (to be described later) executed by the CPU 20, various kinds of standard data such as an OSD (On Screen Display) image to be superimposed on a base image, and the like.

The CPU 20 reads out the operation programs, the standard data, and the like stored in the SSD 22, loads and stores them in the main memory 21, and executes the programs, thereby comprehensively controlling the projector apparatus 10.

The CPU 20 executes various projection operations in accordance with operation signals from an operation unit 23 via the bus B. This operation unit 23 includes a light receiving unit that receives an infrared modulation signal from an operation key included in the main body housing of the projector apparatus 10 or a remote controller (not shown) dedicated for the projector apparatus 10, and accepts a key operation signal and sends a signal corresponding to the accepted key operation signal to the CPU 20 via the bus B.

The CPU 20 is also connected to a wireless LAN interface unit 24 and an acceleration sensor 25 via the bus B.

The wireless LAN interface unit 24 transmits/receives data to/from an external device by wireless communication connection complying with, for example, the IEEE802.11a/11b/11g/11n standard via a wireless LAN antenna 26.

The acceleration sensor 25 detects accelerations in three axis directions orthogonal to each other, and can determine the attitude of the projector apparatus 10 in which a projection operation is performed, by calculating the direction of the gravity acceleration based on a detection output from the acceleration sensor 25.

An operation example according to the embodiment will be described next.

An operation when, as initial settings before the start of projection of an arbitrary image by the projector apparatus 10, the projector apparatus 10 and the digital camera DC are installed and the projection image range of the projector apparatus 10 is set in accordance with the state of the curtain CT, as shown in FIG. 1, will now be described with reference to the accompanying drawings.

Figure 3:
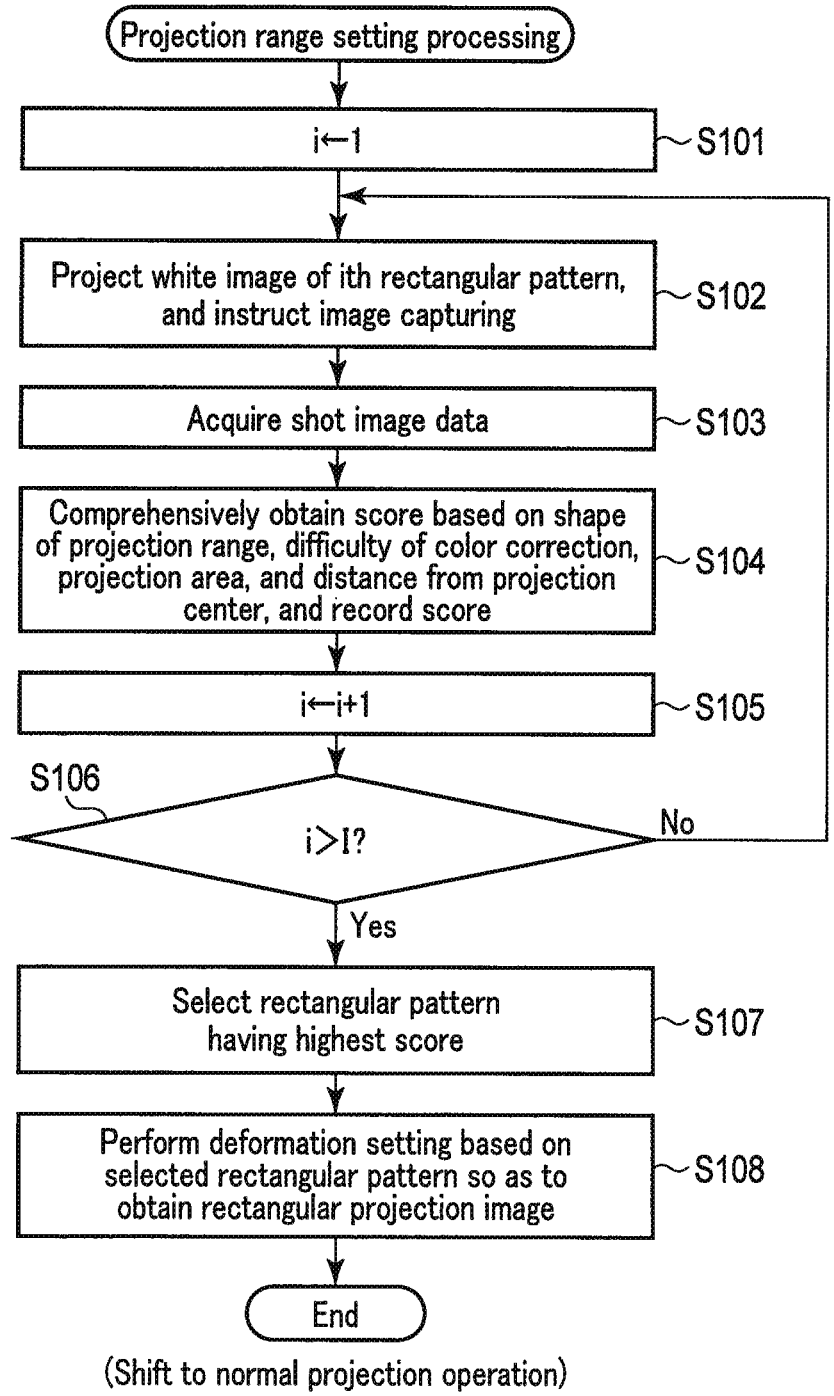
FIG. 3 is a flowchart illustrating processing contents at the time of projection range setting according to the embodiment of the present invention.

FIG. 3 shows processing contents according to the projection range setting program 22A stored in the SSD 22, which are executed by the CPU 20 when the projector apparatus 10 is installed. At the beginning of the processing, the CPU 20 sets a variable i to an initial value "1" (step S101).

The CPU 20 reads out, from the SSD 22, the white image data of the ith rectangular pattern obtained by the variable i set at this time, causes the projection unit 17 to project the image, and then instructs, via the image input unit 11, the digital camera DC to perform shooting (step S102).

The SSD 22 stores, in advance, as the white images of rectangular patterns to be set in the projection unit 17 by the projection range setting program 22A, the white images of a number of rectangular patterns, for example, about 12,000 rectangular patterns each having at least a different size or projection position within the projectable range of the projection unit 17, by adding numbers to the images. The CPU 20 projects the white image of the ith rectangular pattern using the projection unit 17, and causes the digital camera DC to shoot the image projected on the curtain CT.

After that, the CPU 20 acquires, via the image input unit (projection image acquisition unit) 11, the shot image data sent from the digital camera DC via the USB cable UC (step S103). The CPU (projection surface information acquisition unit) 20 acquires the surface shape such as a three-dimensional shape or the color information such as a color distribution of the projection target surface from the projection image acquired by the image input unit 11.

More specifically, the CPU (projection surface information acquisition unit) 20 extracts a partial range considered as the white image of the rectangular pattern from the acquired shot image, represents, by points indicating appropriateness/inappropriateness of projection, the contour shape of the projection range representing the similarity with the original rectangle, the difficulty of color correction in the rectangular pattern that is originally white, a projection area on the curtain CT, and the distance from the central position of the projectable range of the projection unit 17 in accordance with preset criteria, calculates the total of the points, and records the total as a score for the rectangular pattern (step S104).

In this case, while the contour shape of the projection range and the difficulty of color correction in the rectangular pattern are represented by points with higher priority levels, the projection area on the curtain CT and the distance from the central position of the projectable range of the projection unit 17 are represented by points with relatively low priority levels.

After that, the CPU 20 updates and sets the value of the variable i by adding "+1" (step S105), and determines whether the updated and set value of the variable i exceeds the total number I of white images of the rectangular patterns stored in advance in the SSD 22 (step S106).

If it is determined that the updated and set value of the variable i does not exceed the total number I of white images of the rectangular patterns, the CPU 20 returns to the processing in step S102 to causes the projection unit 17 to project the white image of a new rectangular pattern based on the updated and set value of the variable i and instruct, via the image input unit 11, the digital camera DC to perform shooting.

The processes in steps S102 to S106 are repeatedly executed in this way, thereby obtaining and storing a score for each of all the I white images of the rectangular patterns.

Figure 4A:
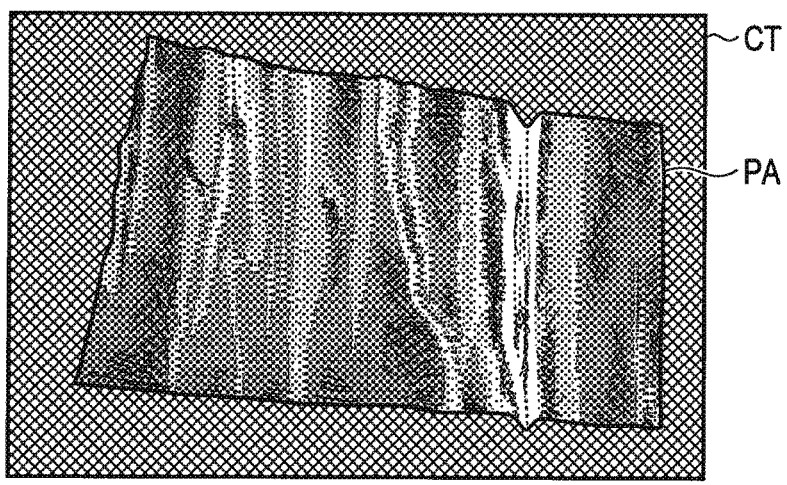
FIGS. 4A, 4B, and 4C are views each exemplifying a shot image when a curtain as a projection target waves finely according to the embodiment of the present invention.

FIG. 4A is a view exemplifying a shot image when the curtain CT as a projection target waves finely and especially the contour line in the horizontal direction of the maximum projection range PA of the projection unit 17, that is originally rectangular, curves finely. The entire image is represented by hatching so that a portion having a particularly larger curvature in FIG. 4A is whiter.

Figure 4B:
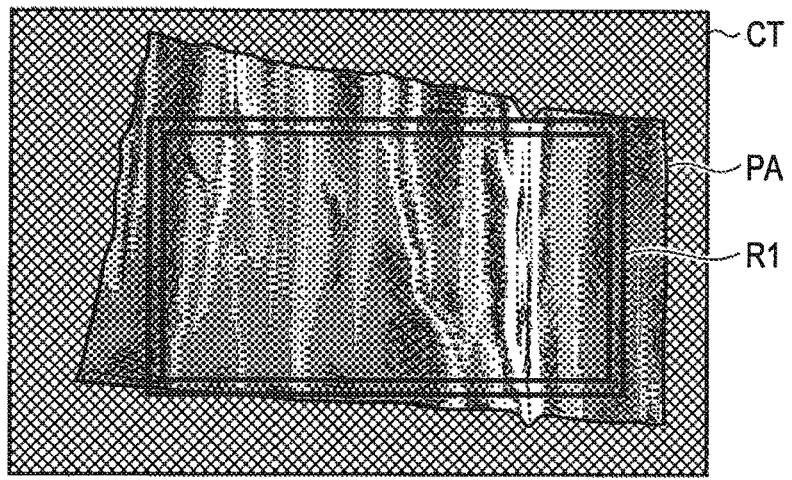

FIG. 4B is a view exemplifying a largest rectangle R1 that can be set within the projection range PA. Therefore, if the white image of the rectangular pattern closest to the rectangle R1 is projected, the point about the projection area on the curtain CT calculated in step S104 becomes highest.

On the other hand, the rectangle R1 includes a portion where the curvature of the surface is significantly large due to the shape of the curtain CT. Thus, the difficulty of correction for the contour shape of the projection range, that has a higher priority level in terms of the point, becomes high, and the point becomes low accordingly.

Figure 4C:
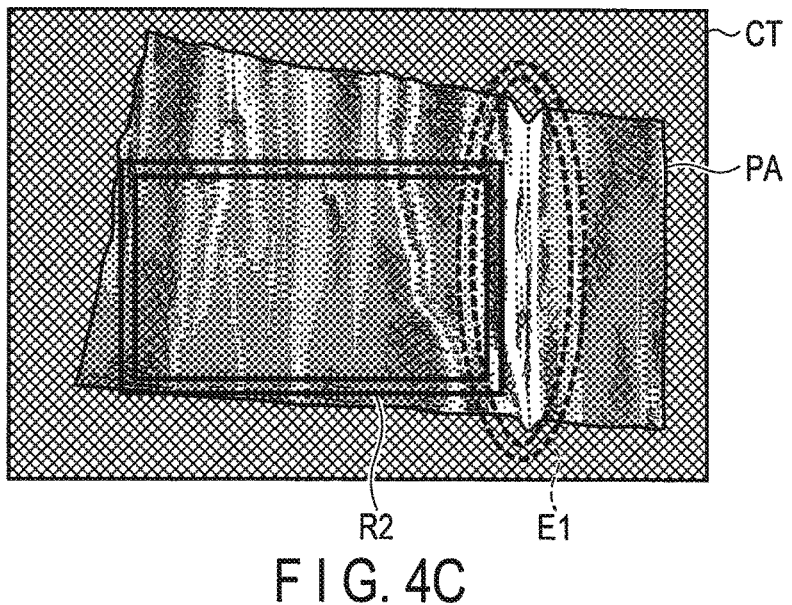

FIG. 4C is a view exemplifying a rectangle R2 that is set by avoiding a portion E1 where the curvature of the surface is significantly large due to the three-dimensional shape (surface shape) of the curtain (projection target surface) CT. There is provided a curvature extraction unit that excludes, if the curvature of the projection target surface is equal to or larger than a threshold, a region, where the curvature is equal to or larger than the threshold, from the projection range. Therefore, if the white image of the rectangular pattern closest to the rectangle R2 is projected, the possibility that higher points are obtained as a whole, as compared with the case shown in FIG. 4B, becomes high without lowering the point about the difficulty of correction for the contour shape caused by the portion E1 while the point about the projection area on the curtain CT calculated in step S104 becomes relatively high.

Figure 5A:
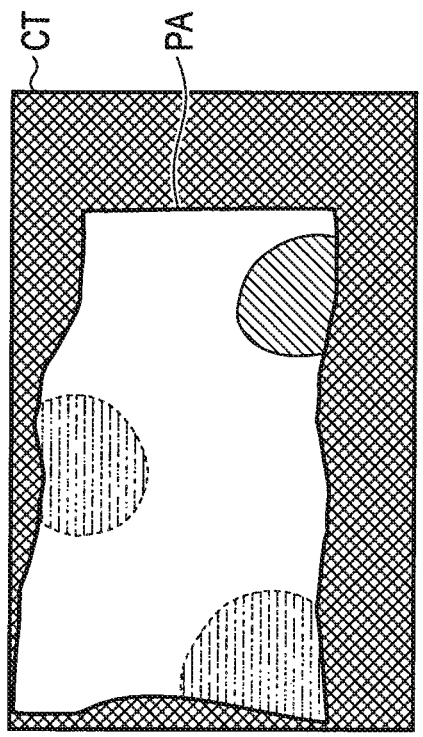
FIGS. 5A, 5B, 5C, and 5D are views each exemplifying a shot image when a curtain as a projection target has a ground color and a pattern according to the embodiment of the present invention.

FIG. 5A is a view exemplifying a shot image when the curtain CT as a projection target has a yellow background and a pattern of blue, green, and brown circles is included in the maximum projection range PA of the projection unit 17.

Figure 5B:
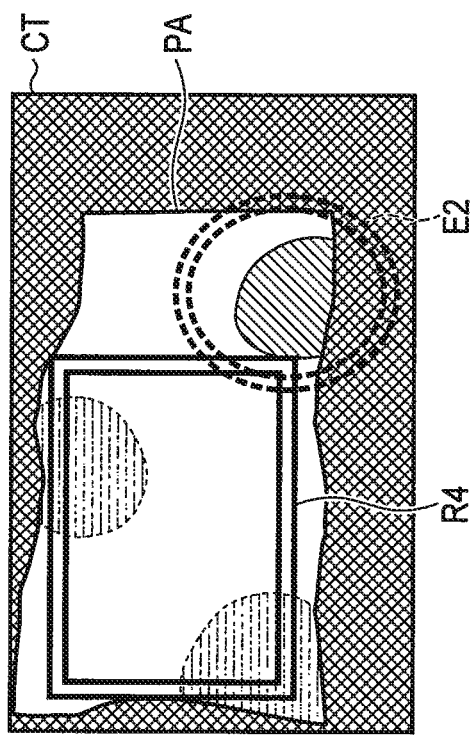

FIG. 5B is a view exemplifying a case in which color correction is performed within the projection range PA while maintaining given brightness. FIG. 5B shows a state in which the background color can be corrected to almost white as a whole, as compared with the projection range PA shown in FIG. 5A, but the blue circular portions cannot be completely corrected and, as a result, the blue portions that are partially fuzzy are seen and the brown circular portion apparently remains as a pattern of a yellow circle due to color correction.

Figure 5C:
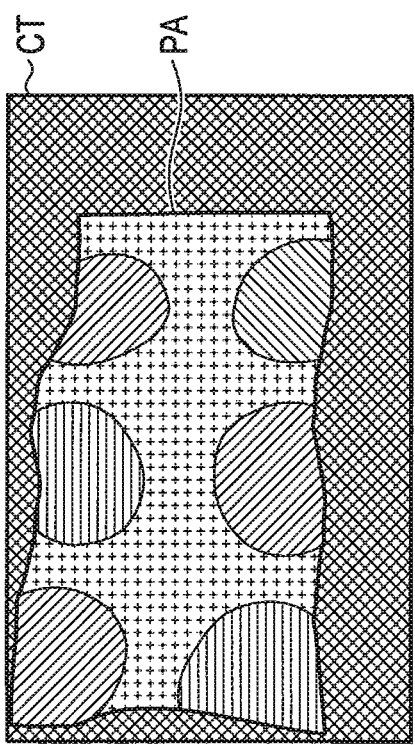

FIG. 5C is a view exemplifying a largest rectangle R3 that can be set within the projection range PA. Therefore, if the white image of the rectangular pattern closest to the rectangle R3 is projected, the point about the projection area on the curtain CT calculated in step S104 becomes highest.

On the other hand, the rectangle R3 includes a significantly small number of blue components due to the pattern of the curtain CT, and thus also includes a yellow circular portion E2 (original brown circular portion) that unwantedly remains by performing color correction while maintaining given brightness. Therefore, the possibility that the image quality degrades in subsequent image projection is high, and the point about the difficulty of color correction, that has a higher priority level in terms of the point, becomes low.

Figure 5D:
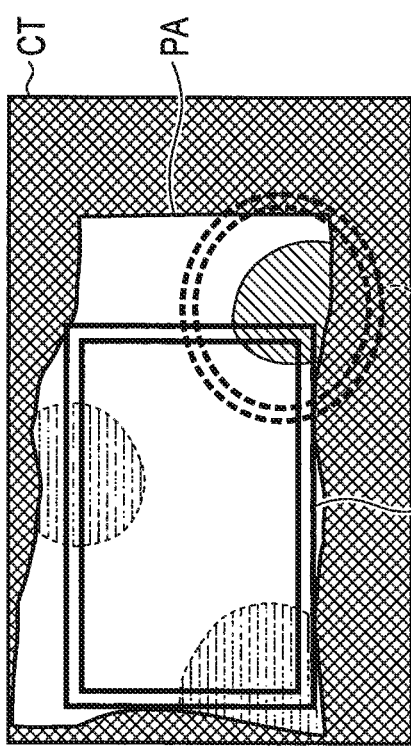

FIG. 5D is a view exemplifying a rectangle R4 that is set by avoiding the yellow circular portion E2 where color correction is difficult due to the pattern of the curtain CT. Therefore, if the white image of the rectangular pattern closest to the rectangle R4 is projected, the possibility that higher points are obtained as a whole, as compared with the case shown in FIG. 5C, becomes high without lowering the point about the difficulty of color correction caused by the portion E2 while the point about the projection area on the curtain CT calculated in step S104 becomes relatively high.

As described above, for each of the projection images obtained using all the I white images of the rectangular patterns, the contour shape of the projection range representing the similarity with the original rectangle, the difficulty of color correction in the rectangular pattern, the projection area on the curtain CT, and the distance from the central position of the projectable range of the projection unit 17 are represented by points, and the total of the points is recorded as a score.

When the value of the variable i becomes equal to "I+1" as a result of updating and setting the variable i by adding "+1" in step S105, it is determined in step S106 that the value exceeds the total number I of white images of the rectangular patterns stored in advance in the SSD 22, and the rectangular pattern having the highest one of the scores of the projection images obtained using all the I white images of the rectangular patterns recorded so far is selected (step S107).

Based on the surface shape or color information of the projection target surface acquired by the CPU (projection surface information acquisition unit) 20, the CPU (projection control unit) 20 determines a range of an image to be projected by the projection unit 17, thereby performing projection so as to obtain a defined shape on the projection target surface. That is, if the brightness of the projection range is equal to or smaller than a threshold, the CPU (projection control unit) 20 determines, as the projection range, a range obtained by excluding a region where the brightness is equal to or smaller than the threshold.

More specifically, the CPU (projection control unit) 20 converts, into a numerical value, the surface shape or color information of the projection target surface acquired by the CPU (projection surface information acquisition unit) 20 for each of the test projection images of the plurality of patterns, and determines, based on the test projection image having the largest numerical value, a range of an image to be projected by the projection unit.

Furthermore, the CPU (projection control unit) 20 converts, into a numerical value, the area on the projection target surface or the distance from the central position of the projection target surface on which the projection unit can perform projection, that has been acquired by the CPU (projection surface information acquisition unit) 20 for each of the test projection images of the plurality of patterns.

The CPU (projection control unit) 20 provides a threshold corresponding to each item that is converted into a numerical value, and excludes, from a determination target, the test projection image having the item that does not reach the threshold.

As described above, the CPU (projection control unit) 20 performs change setting based on the selected rectangular pattern so that the image projected on the curtain CT is rectangular (step S108).

The CPU 20 ends the processing, shown in FIG. 3, related to setting of the projection range, and shifts to a normal projection operation based on the image signals actually input to the image input unit 11 from the external device.

As described in detail above, according to this embodiment, it is possible to project a large image with quality as high as possible on the projection target other than a dedicated screen.

Note that in the embodiment, the test images of the plurality of rectangular patterns stored in the SSD 22 are sequentially projected, and the contour shape and the difficulty of color correction for each image actually projected on the projection target are represented by points. Based on the scores of the totals of the points, the rectangular pattern having the highest score is selected. Then, a subsequent projection operation is set. Therefore, it is possible to implement an appropriate image projection environment in accordance with the state of the projection target.

In the embodiment, an operation of projecting and capturing the rectangular pattern of the white image and obtaining a score is performed the number of times that is equal to the number of rectangular patterns. After that, the rectangular pattern having the highest score is selected, and undergoes correction (deformation setting) so as to obtain a rectangular projection image. Therefore, as compared with a case in which an operation of projecting and capturing a correction pattern obtained by correcting the rectangular pattern is performed the number of times that is equal to the number of rectangular patterns and the reproducibility is then calculated, the processing can be reduced since a correction count is one.

In the embodiment, in addition to the contour shape and the difficulty of color correction for each image actually projected on the projection target, the projection area and the distance from the central position of the projectable range are represented by points, and a score is calculated. Therefore, it is possible to project an image which the user can more easily see.

In the above embodiment, the contour shape of the image, the difficulty of color correction, the projection area, and the distance from the central position of the projectable range are represented by points by adding preset priority levels. Thus, it is possible to perform more flexible setting, for example, change setting of the priority levels in accordance with a projection mode or the like required by the user.

Although not described in the above embodiment, it is possible to shorten the processing and time required for selection by providing a threshold for each of the items represented by the points, and performing processing so as to exclude, from the selection target, the test image of the rectangular pattern having the item that does not reach the corresponding threshold.

Note that the above embodiment has explained the DLP® (Digital Light Processing) type projector apparatus using the semiconductor light-emitting element. However, the present invention is not intended to limit the projection method for the projector apparatus and the element serving as a light source.

The present invention is not limited to the above-described embodiment, and can be variously modified without departing from the scope of the present invention in practical stages. The functions executed by the above-described embodiment can be appropriately combined as much as possible and practiced. The above-described embodiment incorporates various kinds of stages, and various kinds of inventions can be extracted by appropriate combinations of the plurality of disclosed constituent elements. For example, even if some constituent elements are deleted from all the constituent elements disclosed in the embodiment, an arrangement from which some constituent elements are deleted can be extracted as an invention if an effect can be obtained.

What is claimed is:

1. A projection apparatus comprising:
   memory for storing programs and a processor for executing the programs to perform a plurality of operations including:
   a projection operation that projects test images of a plurality of patterns;
   a projection image acquisition operation that acquires test projection images of the plurality of patterns in a projectable range on a projection target surface on which the test images of the plurality of patterns are projected;
   a projection surface information acquisition operation that acquires curvature information and information about brightness of the projectable range of the projection target surface from the acquired test projection images of the plurality of patterns; and
   a projection control operation that determines, based on the curvature information and the information about brightness of the projectable range of the projection target surface, a projection range and a projection position where projection is performed, from the projectable range of the projection operation, and performs projection so as to obtain a defined shape in the projectable range on the projection target surface,
   wherein the projection control operation includes:
   when there is a region where a curvature is equal to or larger than a first threshold in the projectable range on the projection target surface, determining as the projection range, a range obtained by excluding the region where the curvature is equal to or larger than the first threshold, and when there is a region where a brightness is not larger than a second threshold in the projectable range on the projection target surface, determining as the projection range, a range obtained by excluding the region where the brightness is not larger than the second threshold, and calculating for each of the test projection images of the plurality of patterns, a total of points by converting, into a numerical value, a contour shape of a projection range, which corresponds to the curvature information, and a difficulty of color correction in a pattern, which corresponds to the information about brightness of the projection target surface, a projection area on the projection target surface and a distance from a central position of the projection target surface on which the projection operation can perform projection, which have been acquired by the projection surface information acquisition operation, and determining, based on a test projection image having a largest numerical value, a range of an image to be projected by the projection operation.

2. The apparatus of claim 1, wherein the projection control operation provides a threshold corresponding to an item converted into a numerical value, and excludes, from a determination target, the test projection image having the item that does not reach the threshold.

3. A projection method for a projector apparatus that is operable to project an image, the projection method comprising:
   acquiring a projection image in a projectable range on a projection target surface on which the image is projected;
   acquiring curvature information and information about brightness of the projectable range of the projection target surface from the acquired projection image; and
   performing a projection control operation of determining, based on the curvature information and the information about brightness of the projectable range of the projection target surface, a projection range of an image to be projected by the projector apparatus, and performing projection so as to obtain a defined shape in the projectable range on the projection target surface,
   wherein the projection control operation includes:
   when there is a region where a curvature is equal to or larger than a first threshold in the projectable range on the projection target surface, determining as the projection range, a range obtained by excluding the region where the curvature is equal to or larger than the first threshold, and when there is a region where a brightness is not larger than a second threshold in the projectable range on the projection target surface, determining as the projection range, a range obtained by excluding the region where the brightness is not larger than the second threshold, and
   calculating for each of the test projection images of the plurality of patterns, a total of points by converting, into a numerical value, a contour shape of a projection range, which corresponds to the curvature information, and a difficulty of color correction in a pattern, which corresponds to the information about brightness of the projection target surface, a projection area on the projection target surface and a distance from a central position of the projection target surface on which the projection operation can perform projection, which have been acquired by the projection surface information acquisition operation, and determining, based on a test projection image having a largest numerical value, a range of an image to be projected by the projection operation.

4. A non-transitory computer-readable storage medium having a program stored thereon which controls a computer incorporated in an apparatus including a projection unit that projects an image, to perform functions comprising:
   a projection image acquisition unit that acquires a projection image in a projectable range on a projection target surface on which the projection unit projects the image;
   a projection surface information acquisition unit that acquires curvature information and information about brightness of the projectable range of the projection target surface from the projection image acquired by the projection image acquisition unit; and
   a projection control unit that determines, based on the curvature information and the information about brightness of the projectable range of the projection target surface acquired by the projection surface information acquisition unit, a projection range of an image to be projected by the projection unit, and performs projection so as to obtain a defined shape in the projectable range on the projection target surface,
   wherein the projection control unit executes:
   when there is a region where a curvature is equal to or larger than a first threshold in the projectable range on the projection target surface, determining as the projection range, a range obtained by excluding the region where the curvature is equal to or larger than the first threshold, and when there is a region where a brightness is not larger than a second threshold in the projectable range on the projection target surface, determining as the projection range, a range obtained by excluding the region where the brightness is not larger than the second threshold, and
   calculating for each of the test projection images of the plurality of patterns, a total of points by converting, into a numerical value, a contour shape of a projection range, which corresponds to the curvature information, and a difficulty of color correction in a pattern, which corresponds to the information about brightness of the projection target surface, a projection area on the projection target surface and a distance from a central position of the projection target surface on which the projection operation can perform projection, which have been acquired by the projection surface information acquisition operation, and determining, based on a test projection image having a largest numerical value, a range of an image to be projected by the projection operation.

* * * * *